Oct. 31, 1950  U. PIANTA ET AL  2,528,286
MECHANICAL MOVEMENT
Filed April 17, 1947
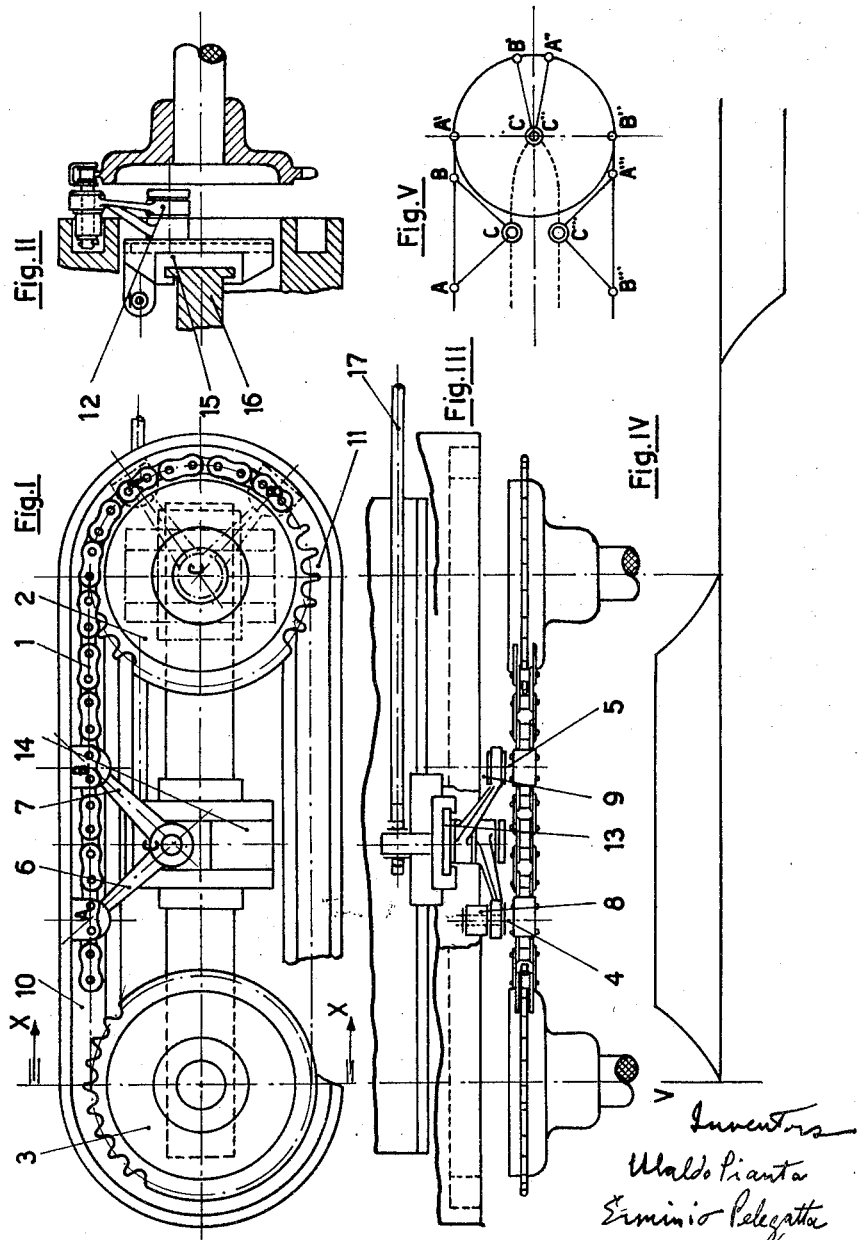
Inventors
Ulaldo Pianta
Erminio Pelegatta
Giovanni Nolli
by
Foster & Cordier
attorneys.

Patented Oct. 31, 1950

2,528,286

UNITED STATES PATENT OFFICE 2,528,286

MECHANICAL MOVEMENT

Ubaldo Pianta and Erminio Pelegatta, Milan, and Giovanni Nolli, Cremona, Italy, assignors to Società Italiana Ernesto Breda per Costruzioni Meccaniche, Milan, Italy, a firm Application April 17, 1947, Serial No. 742,184
In Italy November 18, 1944

Section 1, Public Law 690, August 8, 1946
Patent expires November 18, 1964

1 Claim. (Cl. 74—37)

The present invention relates to a device for transforming a continuous rotary motion, uniform or not, into an alternating motion, generally a rectilinear motion, with a gradual retardation at the end of each stroke, a motionless pause and then a gradual start of the movement in the opposite direction.

Such a device can find useful application in many working machines to obtain periodical inversion of movement of certain organs slackening the inertia phenomena of the moving marches.

The attached drawing represents by way of example only an embodiment of said device. Figs. 1 to 3 are, respectively, front, sectional and plan views; Fig. 4 is a diagram of the velocity relatively to the time in the transformed movement.

Fig. 5 is a diagram of the movement in which the dotted line indicates the path of the point C to which the members receiving the alternating motion are applied.

As shown by the drawing the device comprises a continuous chain 1 supported by two sprockets 2—3, one of which is the driving sprocket moving with a continual rotary motion, either uniform or not. Two of the links of said chain, at a certain distance from each other, are provided with pins 4—5, on which the connecting rods 6—7 are pivoted, said pins bearing at their ends the rollers 8—9 sliding in the guides 10—11.

The connecting rods 6—7 are pivoted at their other end on a common journal 12 integral with a slipper 13 moving in a slide 14 cut in a slide block 15, moving in turn in a slide 16. A bar 17 is connected to the slide block 15 to receive and transmit a rectilinear alternating motion in dependence of the motion of the chain.

It is to be noted that the connecting rods are of a length equal to the radius of the sprockets 2—3.

The operation of the above device is the following: When the triangle formed by the two connecting rods and the chain section A—B comprised between the pins 4—5 moves along the straight section of the chain, the slide block 15 will move uniformly.

When the chain section A—B begins to move around the sprocket 2, the distance between the pins 4—5 gets gradually smaller due to curving of said section, and the slide block begins to slow going to the consequent sliding of the slipper 13 in the guide 14. This diminution continues until the velocity gets null, which happens when the two connecting rods are both in a radial direction on the sprocket and the whole chain section A—B rests on the sprocket.

The velocity of the transformed motion keeps them null as long as the whole chain section A—B rests on the sprocket.

By prosecuting the rotation said section begins to unwind from the periphery of the sprocket, that comunicating an opposite motion to the bar 17 driven by the slide block which will follow a gradually accelerated movement as long as the chain section A—B unwinds from the sprocket.

The above device allows to vary the duration of time during which the slide block keeps still; it is sufficient for said purpose, to vary the angle formed by the connecting rods 6—7, by displacing the pins 4—5 so as to vary the length of the section A—B. If indeed the two connecting rods coincide the velocity will keep null during a half revolution of the sprocket, and this dead period decreases as far as the length of the section A—B increases.

Of course most numerous constructional variations of the device described above are possible within the scope of the invention.

Having now particularly described and ascertained the nature of our said invention and in what manner the same is to be performed we declare that what we claim is:

In a device of the kind described, a pair of spaced sprockets one of which constitutes a driving sprocket, a link chain extending around said sprockets and having straight portions between the sprockets, a pair of pins projecting laterally from a pair of spaced links of the chain, a guide bar fixed parallel to said sprockets in the plane of the axes of the sprockets, a guided reciprocating member non-rotatably mounted to move on said guide bar in a line passing through the axes of said sprockets and having a laterally projecting pin, a pair of connecting rods having ends independently pivoted on the last mentioned pin, the remaining ends of said rods being pivoted on respective first mentioned pins, and a guide for the rod ends on the second pin, said guide being fixed transversely on the reciprocating member, rollers on the ends of the first pins, and a guide surrounding the outer face of said chain and having straight channel portions parallel to the straight portions of the chain and guiding said rollers.

UBALDO PIANTA.
ERMINIO PELEGATTA.
GIOVANNI NOLLI.

REFERENCES CITED

The following references are of record in the file of this patent:

UNITED STATES PATENTS

| Number | Name | Date |
|---|---|---|
| 170,927 | Withington | Dec. 7, 1875 |
| 1,756,089 | Hunter | Apr. 29, 1930 |
| 1,774,321 | Detfurth | Aug. 26, 1930 |